United States Patent
Horiguchi et al.

(10) Patent No.: US 6,311,184 B1
(45) Date of Patent: Oct. 30, 2001

(54) SORT AND MERGE FUNCTIONS WITH INPUT AND OUTPUT PROCEDURES

(75) Inventors: Tsuneo Horiguchi, San Jose; Richard Kirchhofer, Fremont, both of CA (US)

(73) Assignee: International Business Machines Corporation, Armonk, NY (US)

(*) Notice: Subject to any disclaimer, the term of this patent is extended or adjusted under 35 U.S.C. 154(b) by 920 days.

(21) Appl. No.: 08/539,513

(22) Filed: Oct. 6, 1995

(51) Int. Cl.[7] .................................................. G06F 17/30
(52) U.S. Cl. ........................................ 707/7; 708/203
(58) Field of Search ........................ 395/600, 800, 395/650, 607, 885; 364/200, 300; 707/1; 708/203

(56) References Cited

U.S. PATENT DOCUMENTS

| | | | |
|---|---|---|---|
| 4,210,961 | * 7/1980 | Whitlow et al. | 364/300 |
| 4,425,617 | * 1/1984 | Sherwood | 395/885 |
| 4,587,628 | * 5/1986 | Archer et al. | 709/302 |
| 4,809,158 | * 2/1989 | McCauley | 364/200 |
| 4,962,451 | * 10/1990 | Case et al. | 395/607 |
| 5,084,815 | * 1/1992 | Mazzario | 395/800 |
| 5,117,495 | * 5/1992 | Liu | 395/607 |
| 5,121,493 | * 6/1992 | Ferguson | 395/600 |
| 5,142,687 | * 8/1992 | Lary | 395/800 |
| 5,210,870 | * 5/1993 | Baum et al. | 395/607 |
| 5,274,805 | * 12/1993 | Ferguson et al. | 395/600 |
| 5,349,684 | * 9/1994 | Edem et al. | 395/800 |
| 5,386,578 | * 1/1995 | Lin | 395/800 |
| 5,396,622 | * 3/1995 | Lee et al. | 395/600 |
| 5,404,520 | * 4/1995 | Sonobe | 395/650 |
| 5,487,164 | * 1/1996 | Kirchhofer et al. | 395/600 |
| 5,487,166 | * 1/1996 | Cossock | 707/7 |
| 5,513,349 | * 4/1996 | Horiguchi et al. | 395/650 |
| 5,519,860 | * 5/1996 | Liu et al. | 395/600 |
| 5,537,622 | * 7/1996 | Baum et al. | 395/800 |

\* cited by examiner

Primary Examiner—Thomas Black
Assistant Examiner—Charles L. Rones
(74) Attorney, Agent, or Firm—Gates & Cooper LLP (57) ABSTRACT

A method, apparatus, and program storage device for supporting improved record processing protocols for COBOL SORT and MERGE functions using input and output procedures in an object program. The SORT and MERGE functions include protocols for obtaining all of the input records via an input procedure in the object program and storing them into a memory area before performing the sort or merge steps of the SORT or MERGE function. Similarly, the SORT and MERGE functions store their results into a memory area before invoking the output procedure in the object program. Also, the present invention provides an optional overflow file which is used if the memory capacity is inadequate to store and retrieve all of the requisite data.

15 Claims, 7 Drawing Sheets

SORT AND MERGE FUNCTIONS WITH INPUT AND OUTPUT PROCEDURES

BACKGROUND OF THE INVENTION

1. Field of Invention

The present invention relates generally to computer implemented compilers and libraries for high-level programming languages and their associated run-time environments, and in particular to a method, apparatus, and program storage device for supporting improved record processing protocols for COBOL SORT and MERGE functions using input and output procedures in an object program.

2. Description of Related Art

A compiler is a computer program that translates a source program into an equivalent object program. The source language is typically a high level language like COBOL, and the object language is the assembly language or machine language of some computer. The translation of the source program into the object program occurs at compile times, and the actual execution of the object program occurs at run-time.

The compiler must perform an analysis of the source program. Then it must perform a synthesis of the object program wherein it first decomposes the source program into its basic parts, and then builds equivalent object programs from those parts. As a source program is analyzed, information is obtained from declarations, and procedural statements, such as loops, file system statements, and function calls. This includes the SORT and MERGE statements available in COBOL. Typically, these function calls are stored in object libraries that are linked and/or bound to the object program at run-time.

Some high-level languages, such as COBOL, require the specification of input and output procedures for the SORT and MERGE functions within the source program, which input and output procedures are then called by the SORT and MERGE functions within the object library. However, this creates problems when the input or the output procedure is invoked while the SORT or MERGE functions are active in the stack.

There is considerable overhead involved in invoking the SORT or MERGE function, and then having the SORT or MERGE function invoke the input or output procedures for each record. As a result, there is a significant amount of overhead for each record being passed to or from the SORT or MERGE functions.

Further, because the program which executed the SORT statement also contains the input and/or output procedures, this results in a "callback" situation. That is: a SORT statement results in an invocation of the sort function, which, in turn, invokes the input and/or output procedures in the same program. This makes the support of language semantics related to the access to resources (such as variables, files and procedures) to be within the program difficult since the input and/or output procedures are in the same program, but are in different execution stack frames.

Thus, there is a need in the art for optimized and improved record processing protocols for SORT and MERGE functions with input and/or output procedures.

SUMMARY OF THE INVENTION

To overcome the limitations in the prior art described above, and to overcome other limitations that will become apparent upon reading and understanding the present specification, the present invention discloses a method, apparatus, and program storage device for supporting improved record processing protocols for SORT and MERGE functions using input and output procedures in an object program.

The present invention overcomes the problems cited above by obtaining all of the input records via the input or output procedures in the object program and storing them into a memory area before invoking the SORT or MERGE function. Similarly, the SORT and MERGE functions store their results into a memory area before invoking the output procedure in the object program. Also, the present invention provides an optional overflow file which is used if the memory capacity is inadequate to store and retrieve all of the requisite data. These features address both the performance implications inherent in invoking the input or output procedures for each input or output record.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

Hardware Environment

Figure 1:
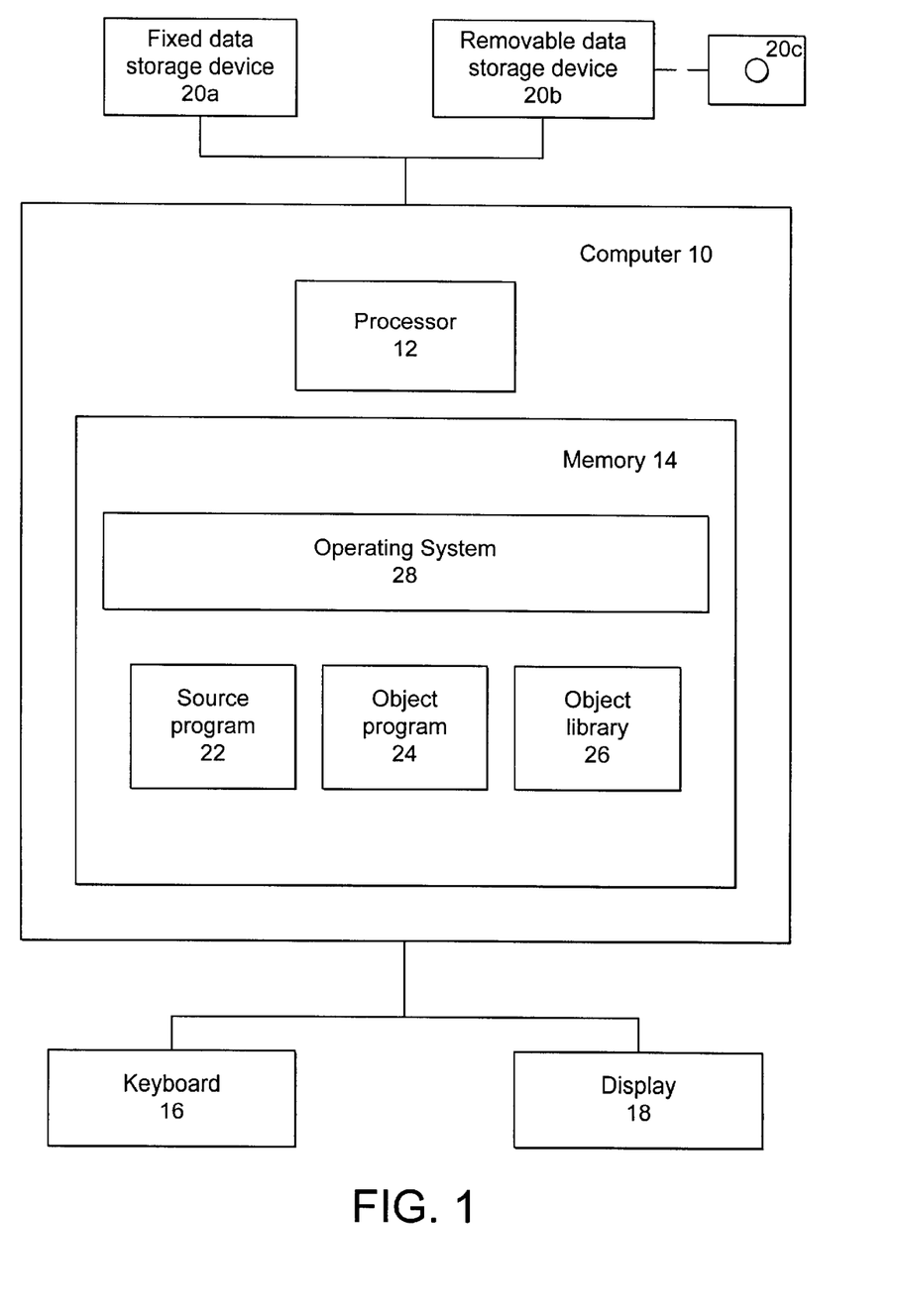
FIG. 1 is a block diagram illustrating an exemplary hardware environment for implementing the preferred embodiment of the present invention.

FIG. 1 is a block diagram illustrating an exemplary hardware environment used to implement the preferred embodiment of the invention. In the exemplary hardware environment, a computer 10 may include, inter alia, a processor 12, memory 14, keyboard 16, display 18, as well as fixed and/or removable data storage devices and their associated media 20a, 20b, and 20c. Those skilled in the art will recognize that any combination of the above components, or any number of different components, peripherals, and other devices, may be used with the computer 10.

The present invention is generally implemented in a source program 22 that is compiled into an object program 24 and linked or bound to an object library 26, wherein both the object program 24 and object library 26 are executed under the control of an operating system 28, such as "OS/2™", "MICROSOFT WINDOWS™", "AIX™", "UNIX™", "DOS™", etc. In the preferred embodiment, the source program 22, object program 24, and object library 26 conform to ANSI COBOL language conventions, although those skilled in the art will recognize that the source program 22, object program 24, and object library 26 could also conform to other language conventions without departing from the scope of the present invention.

Using extensions built into standard ANSI COBOL language conventions according to the present invention, a programmer can enter source language statements into the source program 22 that specify a SORT or MERGE function to be performed on identified data records. These source language extensions, when recognized by a compiler, result in the generation of an object program 24 containing instructions for performing procedure calls to the SORT and MERGE functions associated with the present invention. The SORT and MERGE functions are generally stored in an object library 26 that is linked or bound to the object program 24 prior to or at run-time for the object program 24.

Generally, the source program 22, object program 24, and object library 26 are all tangibly embodied in a computer-readable medium, e.g., one or more of the fixed and/or removable data storage devices and their associated media 20a–c. Moreover, the object program 24 and object library 26 are both comprised instructions which, when read and executed by the computer 10, causes the computer 10 to perform the steps necessary to implement and/or use the present invention. Under control of the operating system 28, the object program 24 and object library 26 may be loaded from the data storage devices 20a–c into the memory 14 of the computer 10 for use during actual operations.

Prior Art SORT and MERGE Functions

Figure 2:
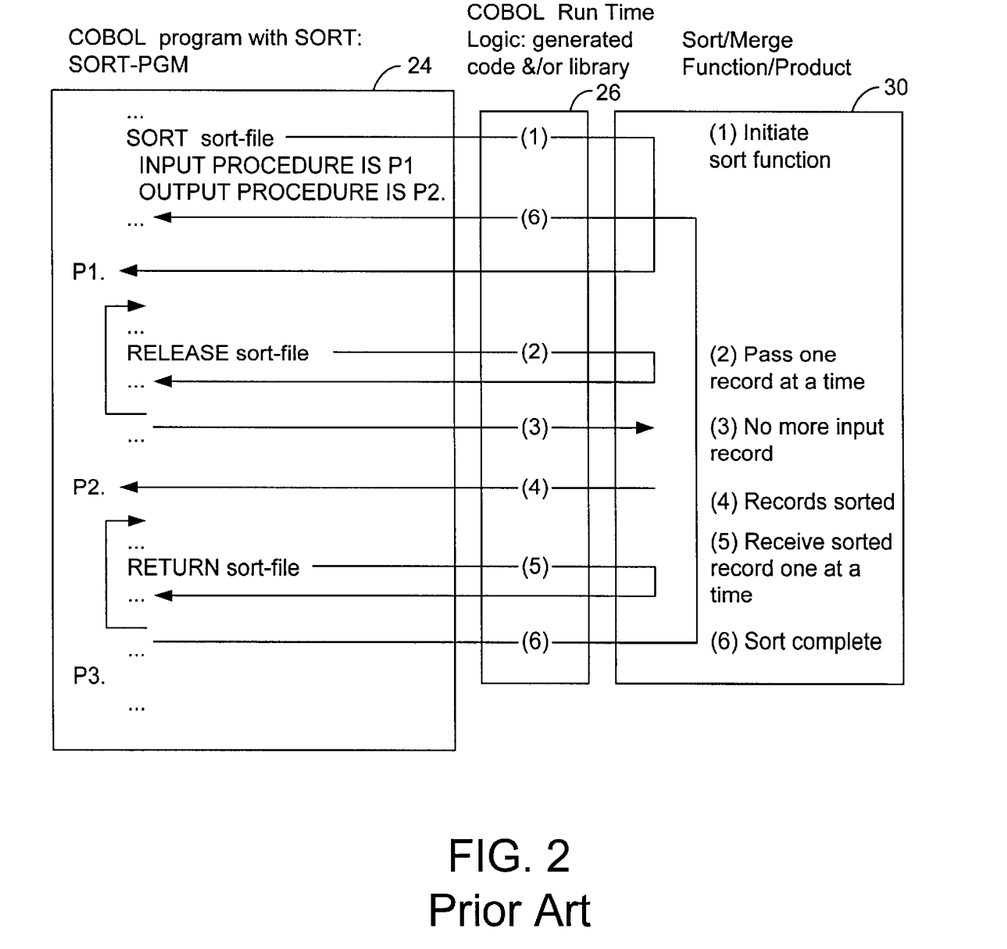
FIG. 2 (prior art) is a dataflow diagram depicting a prior art ANSI COBOL SORT implementation, wherein the SORT function forms a part of an object library, and the INPUT and OUTPUT procedures are defined and specified in an object program.

FIG. 2 is a dataflow diagram depicting a prior art ANSI COBOL SORT function implementation, wherein the SORT function 30 forms a part of the object library 26 and the INPUT and OUTPUT procedures are defined and specified in the object program 24. While only the SORT function transactions are depicted in FIG. 2, those skilled in the art will recognize that analogous transactions are also required for a prior art COBOL MERGE function.

Those skilled in the art will also recognize that the SORT function 30 may be implemented in a number of different ways. For example, the SORT function 30 may be implemented as illustrated in FIG. 2, wherein the SORT function 30 is a separate program executed under control of the operating system 24, and the object program 28 communicates with the SORT function 30 via the object library 26 using some pre-defined protocol. In another embodiment, the SORT function 30 may be implemented as a set of procedures or routines within the object library 26 that are linked or bound to the object program 24. In yet another embodiment, the SORT function 30 may be implemented via extensions to the operating system 24 that are invoked by the object program 28. Those skilled in the art will recognize that these and other implementations of the SORT function 30 could be used without departing from the scope of the present invention.

For illustrative purposes, the instructions and steps performed by the object program 24, object library 26, and SORT function 30 are indicated using source language statements, legends, and arrows in FIG. 2. However, those skilled in the art will recognize that both the object program 24, object library 26, and SORT function 30 are comprised of assembly language or machine language instructions executed by the computer 10.

In the traditional prior art implementation shown in FIG. 2, the object program 24 includes a "call" or invocation of the SORT function 30, identifying a sort-file for the SORT function, an INPUT procedure P1, and an OUTPUT procedure P2. Arrow (1) represents the object program 24 invoking the SORT function 30 via a procedure call to the object library 26, thereby transferring control to the SORT function 30 via the object library 26. Arrow (1) also represents the SORT function 30, in turn, invoking the INPUT procedure P1 in the object program 24 via a procedure call, thereby transferring control to the INPUT procedure P1 in the object program 24. Arrow (2) represents control being transferred from the INPUT procedure P1 back to the SORT function 30 after the INPUT procedure P1 retrieves the first input record. Arrow (2) also represents the SORT function 30 continuing to invoke the INPUT procedure to retrieve each additional input record. Arrow (3) represents control being transferred from the INPUT procedure PI back to the SORT function 30 after the supply of input records is exhausted. At this point, the SORT function 30 sorts the input records. As a result, considerable overhead is incurred in the above steps to retrieve all the necessary input records before a sort is actually performed by the SORT function 30.

After the sort of the input records has been accomplished, arrow (4) represents the SORT function 30 invoking the OUTPUT procedure P2 in the object program 24 via a procedure call, thereby transferring control to the OUTPUT procedure P2 in the object program 24. Arrow (5) represents control being transferred back to the SORT function 30 after the OUTPUT procedure P2 stores the first output record. Arrow (5) also represents the SORT function continuing to invoke the OUTPUT procedure P2 to store each output record, until the supply of output records is exhausted. As with the retrieval of input records, considerable overhead is incurred to store all the output records after the sort has been performed by the SORT function 30. Arrow (6) represents control being transferred back to the SORT function 30 after the supply of output records is exhausted, and represents the SORT function 30 transferring control to the instruction immediately following the call of the SORT function 30 in the object program 24.

Improved SORT and MERGE Functions

Figure 3:
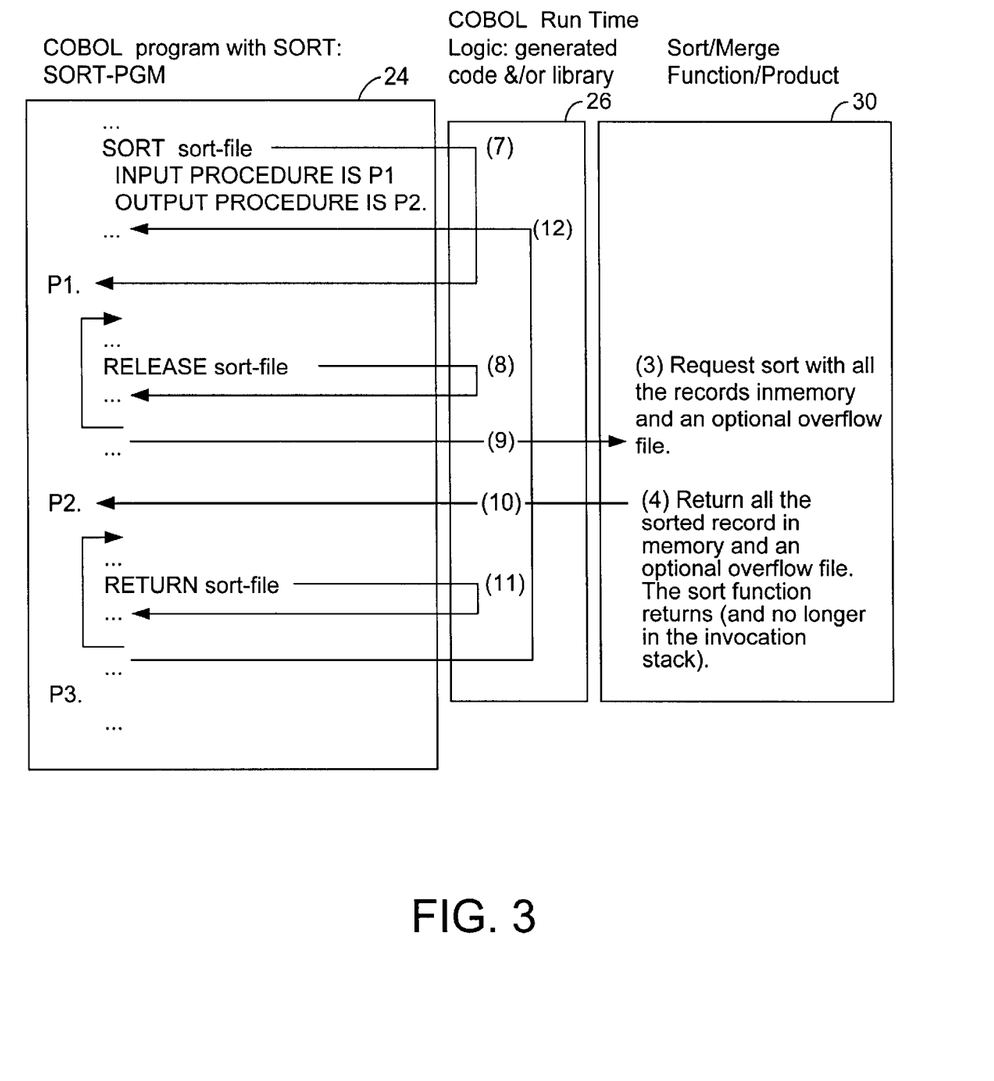
FIG. 3 is a dataflow diagram depicting a new and improved COBOL SORT implementation, wherein the SORT function forms a part of an object library, and the INPUT and OUTPUT procedures are defined and specified in an object program.

FIG. 3 is a dataflow diagram depicting a new and improved COBOL SORT function implementation 30, wherein the SORT function 30 forms a part of the object library 26 and the INPUT and OUTPUT functions are defined and specified in the object program 24. While only the SORT function 30 transactions are depicted in FIG. 2, those skilled in the art will recognize that analogous transactions are also required for an improved COBOL MERGE function.

Like FIG. 2 above, those skilled in the art will also recognize that the SORT function 30 may be implemented in a number of different ways. For example, the SORT function 30 may be implemented as illustrated in FIG. 2, wherein the SORT function 30 is a separate program executed under control of the operating system 24, and the object program 28 communicates with the SORT function 30 via the object library 26 using some pre-defined protocol. In another embodiment, the SORT function 30 may be implemented as a set of procedures or routines within the object library 26 that are linked or bound to the object program 24. In yet another embodiment, the SORT function 30 may be implemented via extensions to the operating system 24 that are invoked by the object program 28. Those skilled in the art will recognize that these and other implementations of the SORT function 30 could be used without departing from the scope of the present invention.

Like FIG. 2, the instructions and steps performed by the object program 24, object library 26, and SORT function 30 are indicated in FIG. 3 using source language statements, legends, and arrows for illustrative purposes. However, those skilled in the art will recognize that both the object program 24, object library 26, and SORT function 30 are comprised of assembly language or machine language instructions executed by the computer 10.

In the improved implementation shown in FIG. 3, the object program 24 includes a "call" or invocation of the SORT function 30, identifying a sort-file for the SORT function, an INPUT procedure P1, and an OUTPUT procedure P2. Arrow (7) represents the object program 24 invoking the object library 26, thereby transferring control to the object library 26. Arrow (7) also represents the object library 26, in turn, invoking the INPUT procedure P1 in the object program 24, thereby transferring control to the INPUT procedure P1 in the object program 24. In contrast to the prior art, the INPUT procedure P1 may not be invoked as a procedure call at all, but rather as a labeled block within the object program 24 where control is transferred using a branch or "perform" statement. As a result, the INPUT procedure P1 can be invoked without creating any new stack frame. Arrow (8) represents control remaining in the INPUT procedure P1 until all of the input records are retrieved. Further, the retrieved input records are stored in a table in the memory 14 of the computer 10. Optionally, if the memory 14 has insufficient capacity to store all the retrieved input records, the excess input records (or all the input records) may be stored in an overflow file on a data storage device 20a–c attached to the computer 10. Once all the input records have been stored in the memory 14, and optionally an overflow file, arrow (9) represents control being transferred from the INPUT procedure P1 to the SORT function 30. At this point, the SORT function 30 receives all the sort input records at once and sorts the records.

After the sort of the input records has been accomplished, the SORT function 30 stores the output records in another or the same table stored in the memory 14 of the computer. Optionally, the output records may be stored in an overflow file on the data storage device attached to the computer 10. Arrow (10) represents the SORT function 30 invoking the OUTPUT procedure P2 in the object program 24, thereby transferring control to the OUTPUT procedure P2 in the object program 24. At this point the SORT function 30 is no longer in the invocation stack. Like the INPUT procedure P1, control may be transferred to the OUTPUT procedure P2 using a branch or "perform" statement rather than a procedure call. As a result, the OUTPUT procedure P2 can be invoked without incurring a new stack frame. Arrow (11) represents control remaining in the OUTPUT procedure P2 until all of the output records are retrieved from the table in the memory 14 of the computer, and optionally an overflow file, and stored in an output file. Arrow (12) represents control being transferred to the instruction immediately following the call of the SORT function 30 in the object program 24.

The result of the present invention is to eliminate the overhead associated with processing single records, as is the convention in prior art COBOL SORT and MERGE functions. This feature of the present invention considerably enhances the performance of the SORT and MERGE functions, without loss of functionality.

Figure 4:
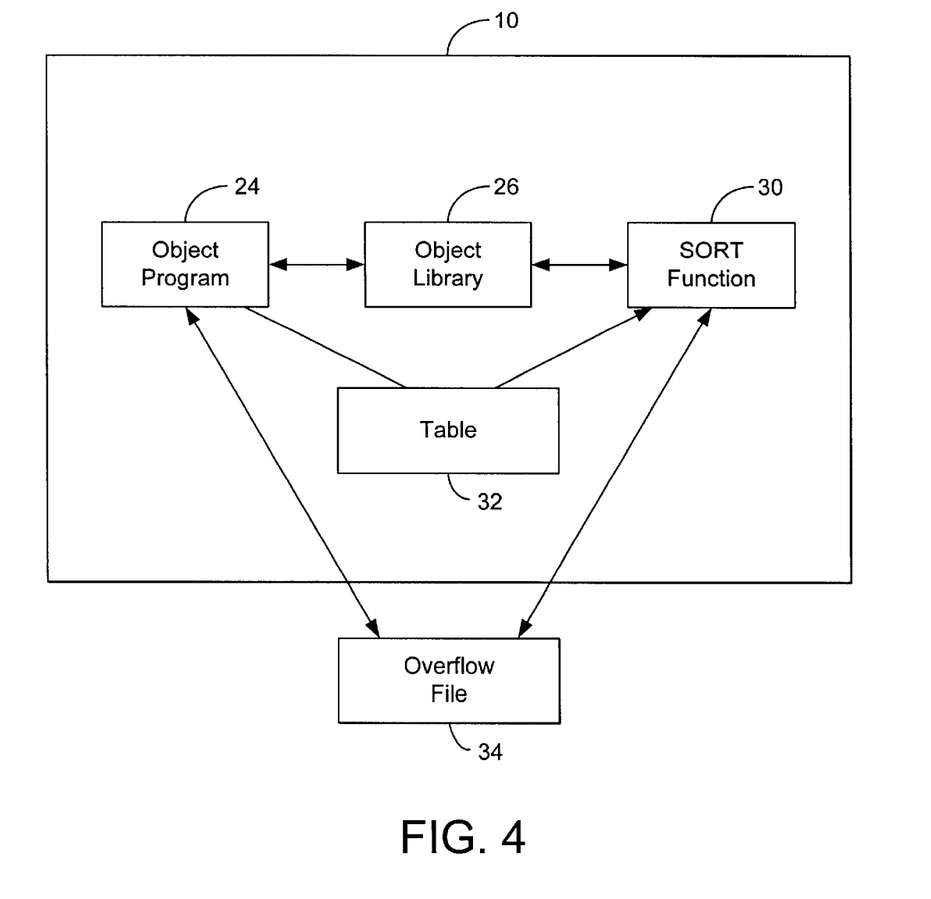
FIG. 4 is a block diagram illustrating the structure and relationship of the table and overflow file according to the present invention.

FIG. 4 is a block diagram illustrating the structure and relationship of the table 32 and overflow file 34 according to the present invention. As described above in conjunction with FIG. 3, the INPUT procedure P1 in the object program 24 stores all of the retrieved input records in a table 32 in the memory 14 of the computer 10. Optionally, if the memory 14 has insufficient capacity to store the retrieved input records in the table 32, the excess input records (or all the input records) may be stored in an overflow file 34 on a data storage device 20a–c attached to the computer 10. The SORT function 30 accesses and then sorts the input records stored in the table 32 and/or the overflow file 34. After the sort of the input records has been accomplished, the SORT function 30 stores the output records in another or the same table 32 stored in the memory 14 of the computer 10. Optionally, the output records may be stored in another or the same overflow file 34 on the data storage device 20a–c attached to the computer 10. Like the INPUT procedure P1, the OUTPUT procedure P2 in the object program 24 accesses and retrieves all of the output records from another or the same table 32 in the memory 14 of the computer 10, and optionally another or the same overflow file 34 on the data storage device 20a–c attached to the computer 10, and performs the desired output function.

Figure 5:
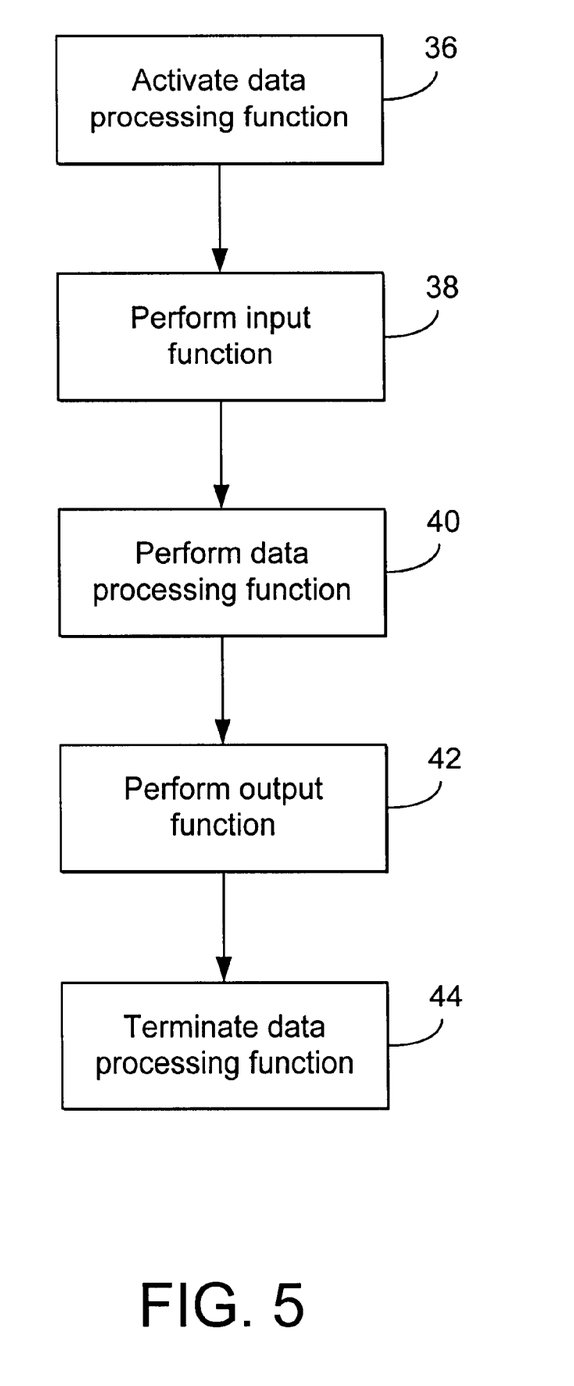
FIG. 5 is a flowchart that illustrates the logic performed during the SORT or MERGE function, or any other similar data processing function, according to the present invention.

FIG. 5 is a flowchart that illustrates the logic performed during the SORT or MERGE function, or any other similar data processing function (which involves handling of input or output data for such function to be processed via procedure exists), according to the present invention. Block 36 represents the activation of the specified data processing function, regardless of whether it is a SORT function, MERGE function, or other defined function. At this point during processing, the arguments used with the request for the data processing function, such as collating sequence, sort key information, etc., are also saved. Thereafter, Block 38 represents the data processing function activating an input function in the computer 10 for retrieving all of the input data into the table 32 in the memory 14 of the computer 10 and/or the overflow file 34 on the data storage device 20a–c. In the preferred embodiment, this transfer of control occurs using a "perform" style transfer rather than a "call" style transfer. Block 40 represents the data processing function being performed on the input data in the memory 14 of the computer 10 after the input function 38 has completed. When the function is invoked, the saved arguments such as collating sequence, sort information, etc., are passed to the function. Moreover, the function generates the output data and stores the output data in the table 32 in the memory 14 of the computer 10 and/or the overflow file 34 on the data storage device 20a–c. Block 42 represents the data processing function 40 activating an output function in the computer 10 for retrieving the output data from the table 32 in the memory 14 of the computer 10 and/or the overflow file 34 on the data storage device 20a–c, and then outputting the output data. Of course, those skilled in the art will recognize that the output function could encompass any number of functions, including functions that do not write or store the data on devices. Finally, block 44 represents the termination of the data processing function after the output function 42 has completed.

Figure 6:
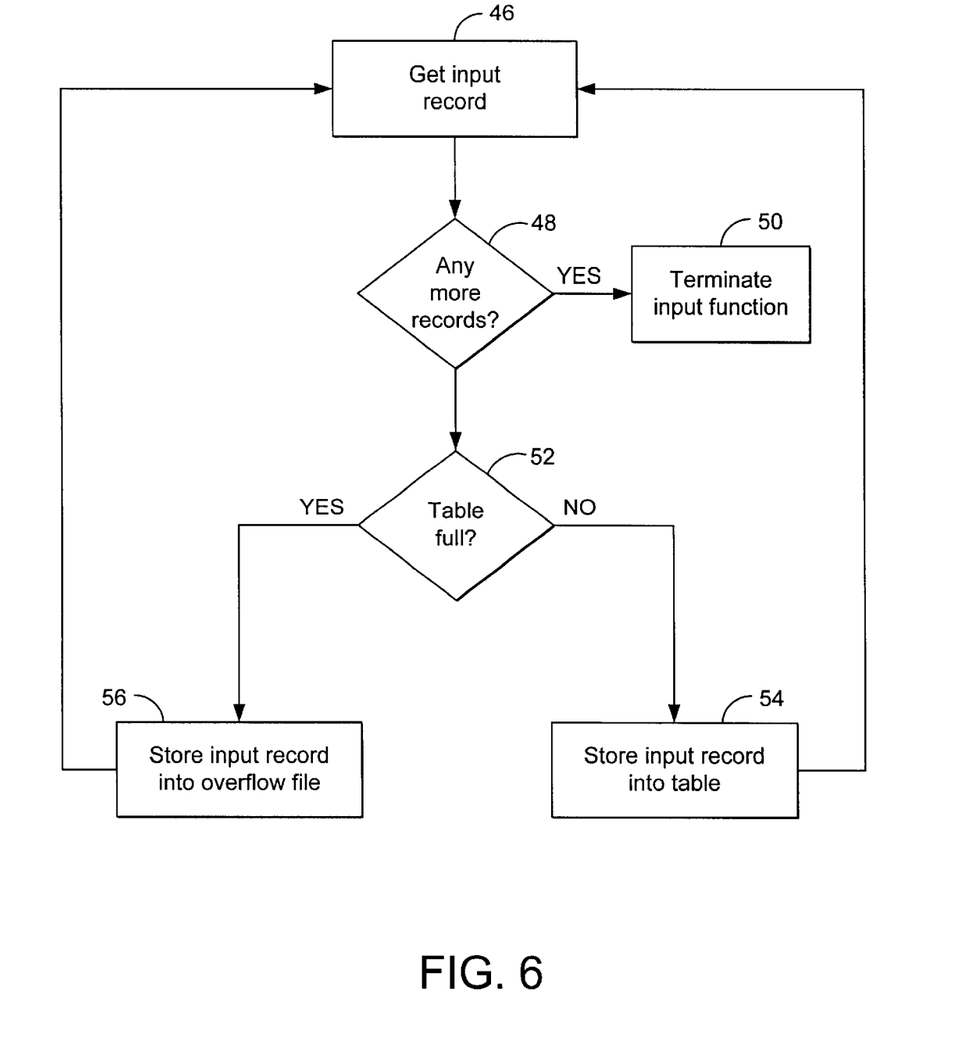
FIG. 6 is a flowchart that illustrates an example of the logic performed by the INPUT function according to the present invention.

FIG. 6 is a flowchart that illustrates an example of the logic performed by the INPUT function according to the present invention. Those skilled in the art, however, will recognize that any number of different INPUT functions could be defined without departing from the scope of the present invention. In the INPUT function, block 46 represents the reading of the next input data record. Thereafter, Block 48 is a decision block that represents the INPUT function determining whether the read of the input record had an error. If so, control transfers to block 50, which represents a termination of the INPUT function, and subsequent branch or transfer of control back to the data processing function that invoked the INPUT function. If not, control transfers to block 52. Block 52 is a decision block that represents the INPUT function determining whether the table 32 in the memory 14 of the computer 10 is full. If not, block 56 represents the INPUT function storing the input record in the table 32 in the memory 14 of the computer 10. Otherwise, control transfers to block 56, which represents the INPUT function storing the input record in the overflow file 34. In both cases, control then transfers back to block 46 to read the next input record.

Figure 7:
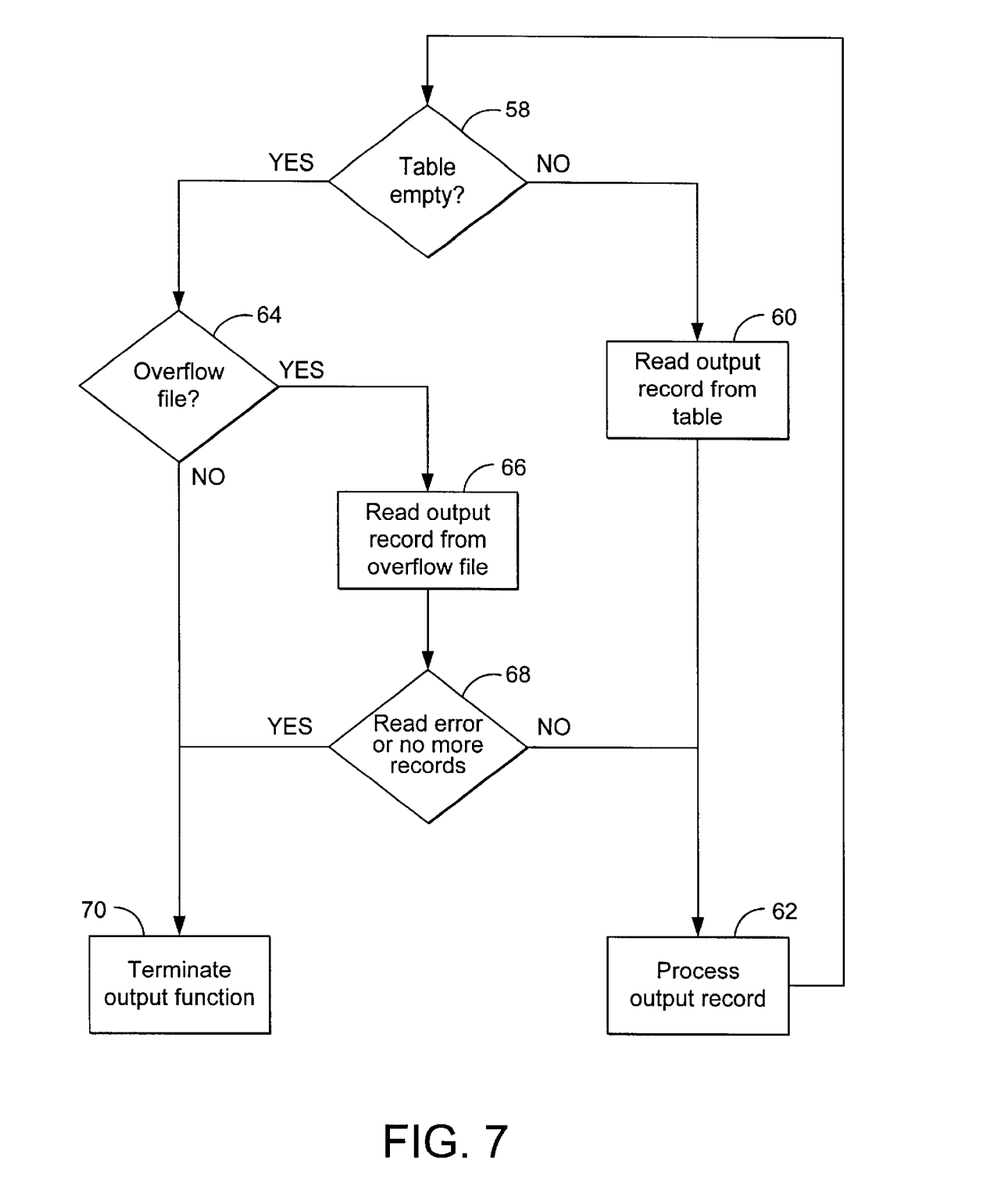
FIG. 7 is a flowchart that illustrates an example of the logic performed by the OUTPUT function according to the present invention.

FIG. 7 is a flowchart that illustrates an example of the logic performed by the OUTPUT function according to the present invention. Those skilled in the art, however, will recognize that any number of different OUTPUT functions could be defined without departing from the scope of the present invention. In the OUTPUT function, block 58 is a decision block that represent the OUTPUT function determining whether the table 32 is empty. If not, control transfers to block 60, which represents the OUTPUT function retrieving the output record from the table 32, and then to block 62, which represents the OUTPUT function processing the output record in some specified manner. Otherwise, control transfers to block 64. Block 64 is a decision block that represents the OUTPUT function determining whether there is an overflow file 34. If so, then control transfers to block 66, which represents the OUTPUT function reading of the next output record from the overflow file 34. After Block 66, Block 68 is a decision block that represents the OUTPUT function determining whether an exception (such as an end-of-file condition) occurred on the read of the output record from the overflow file 34. If so, control transfers to block 70, which represents the termination of the OUTPUT function, and subsequent branch or transfer of control back to the data processing function that invoked the OUTPUT function. Otherwise, control transfers to block 62. After the output record is processed at block 62, control then transfers back to block 58 to read the next output record.

Returning now to Block 64, if there is no overflow file 34, then control transfers to Block 70 for termination of the OUTPUT function.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention.

In addition, any software program adhering (either partially or entirely) to the COBOL language standard could benefit from the present invention. Moreover, other programming languages may benefit from the techniques disclosed herein.

In summary, the present invention discloses a method, apparatus, and program storage device for supporting different record processing protocols for COBOL SORT and MERGE functions using input and output procedures in an object program. The COBOL and MERGE functions include protocols for obtaining all of the input records via an input procedure in the object program and storing them into memory before performing the sort or merge steps of the SORT or MERGE function. Similarly, the SORT and MERGE functions store their results into a memory area before invoking an output procedure in the object program. Also, the present invention provides an optional overflow file which is used if the memory capacity is inadequate to store and retrieve all of the requisite data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing input data to produce output data in a computer having a memory and coupled to a data storage device, the method comprising the steps of:

activating a data processing function in the computer for controlling the processing of data;

the data processing function transferring control to an input function in the computer for retrieving all input data into the memory of the computer prior to performing the data processing function;

performing the data processing function on the input data in the memory of the computer after receiving control from the input function when it has completed, wherein the performing step further comprises the steps of generating output data and storing the output data in the memory of the computer;

the data processing function transferring control to an output function in the computer for retrieving all of the output data from the memory of the computer and storing the output data prior to terminating the data processing function; and terminating the data processing function after receiving control from the output function when it has completed.

2. The method of claim 1, wherein the data processing function is a sort function.

3. The method of claim 1, wherein the data processing function is a merge function.

4. The method of claim 1, wherein the input function comprises the steps of:

storing the input data in a table in the memory of the computer until the table is full; and storing the input data in an overflow file on the data storage device when the table is full.

5. The method of claim 1, wherein the step of storing the output data in the memory of the computer comprises the steps of:

storing the output data in a table in the memory of the computer until the table is full; and storing the output data in an overflow file on the data storage device when the table is full.

6. An apparatus for processing input data to produce output data, comprising:

(a) a computer having a memory and coupled to a data storage device;

(b) means, performed by the computer, for performing a data processing function in the computer, wherein the data processing function controls processing of data and further comprises means for transferring control to an input function in the computer for retrieving all input data into the memory of the computer prior to performing the data processing function, means for generating output data after receiving control from the input function, means for storing the output data in the memory of the computer, means for transferring control to an output function in the computer for retrieving all of the output data from the memory of the computer and storing the output data prior to terminating the data processing function, and means for terminating the data processing function after receiving control from the output function when it has completed.

7. The apparatus of claim 6, wherein the data processing function is a sort function.

8. The apparatus of claim 6, wherein the data processing function is a merge function.

9. The apparatus of claim 6, wherein the input function comprises:

means for storing the input data in a table in the memory of the computer until the table is full; and means for storing the input data in an overflow file on the data storage device when the table is full.

10. The apparatus of claim 6, wherein the means for storing the output data in the memory of the computer comprises:

means for storing the output data in a table in the memory of the computer until the table is full; and means for storing the output data in an overflow file on the data storage device when the table is full.

11. A program storage device, readable by a computer having a memory and coupled to a data storage device, tangibly embodying one or more programs of instructions executable by the computer to perform method steps of processing input data to produce output data, the method comprising the steps of:

activating a data processing function in the computer for controlling processing of data;

the data processing function transferring control to an input function in the computer for retrieving all input data into the memory of the computer prior to performing the data processing function;

performing the data processing function on the input data in the memory of the computer after receiving control from the input function when it has completed, wherein the performing step further comprises the steps of generating output data and storing the output data in the memory of the computer;

the data processing function transferring control to an output function in the computer for retrieving all of the output data from the memory of the computer and storing the output data prior to terminating the data processing function; and terminating the data processing function after receiving control from the output function when it has completed.

12. The program storage device of claim 11, wherein the data processing function is a sort function.

13. The program storage device of claim 11, wherein the data processing function is a merge function.

14. The program storage device of claim 11, wherein the input function comprises the steps of:

storing the input data in a table in the memory of the computer until the table is full; and storing the input data in an overflow file on the data storage device when the table is full.

15. The program storage device of claim 11, wherein the step of storing the output data in the memory of the computer comprises the steps of:

storing the output data in a table in the memory of the computer until the table is full; and storing the output data in an overflow file on the data storage device when the table is full.

* * * * *